US012596815B2

(12) United States Patent
Tsai

(10) Patent No.: US 12,596,815 B2
(45) Date of Patent: Apr. 7, 2026

(54) VERIFYING THE AUTHENTICITY OF STORAGE DEVICES

(71) Applicant: SMART Modular Technologies, Inc., Newark, CA (US)

(72) Inventor: Victor Y. Tsai, Palo Alto, CA (US)

(73) Assignee: SMART Modular Technologies, Inc., Newark, CA (US)

( * ) Notice: Subject to any disclaimer, the term of this patent is extended or adjusted under 35 U.S.C. 154(b) by 385 days.

(21) Appl. No.: 17/964,663

(22) Filed: Oct. 12, 2022

(65) Prior Publication Data

US 2024/0126894 A1     Apr. 18, 2024

(51) Int. Cl.
*G06F 21/60* (2013.01)
*G06F 21/31* (2013.01)
*G06F 21/78* (2013.01)

(52) U.S. Cl.
CPC ............ *G06F 21/602* (2013.01); *G06F 21/31* (2013.01); *G06F 21/78* (2013.01)

(58) Field of Classification Search
CPC ......... G06F 21/602; G06F 21/31; G06F 21/78
See application file for complete search history.

(56) References Cited

U.S. PATENT DOCUMENTS

| | | | | | |
|---|---|---|---|---|---|
| 8,918,897 | B2 * | 12/2014 | Resch | ...................... | G06F 21/80 380/278 |
| 2002/0152377 | A1 * | 10/2002 | Bauman | ................ | H04L 9/0844 713/168 |

| | | | | | |
|---|---|---|---|---|---|
| 2004/0064729 | A1 * | 4/2004 | Yellepeddy | ............. | H04L 63/10 726/5 |
| 2009/0193491 | A1 * | 7/2009 | Rao | ........................ | G06F 21/572 726/1 |
| 2009/0261172 | A1 * | 10/2009 | Kumar | .................. | H04L 9/0838 235/492 |
| 2009/0287933 | A1 * | 11/2009 | Beckwith | .............. | H04L 9/3255 713/176 |
| 2010/0095132 | A1 * | 4/2010 | Murray | ............... | G06F 21/6209 713/189 |

(Continued)

FOREIGN PATENT DOCUMENTS

| | | | | | | |
|---|---|---|---|---|---|---|
| CN | 108810063 | A | * | 11/2018 | .......... | G06F 11/1402 |
| CN | 109643285 | A | * | 4/2019 | .......... | G06F 16/258 |

(Continued)

OTHER PUBLICATIONS

Arno Wagner et al, Frequently Asked Questions Cryptsetup/LUKS, Apr. 26, 2020, https://web.archive.org/web/20200427011448/ https:// gitlab.com/cryptsetup/cryptsetup/-/wikis/FrequentlyAskedQuestions (Year: 2020).*

(Continued)

*Primary Examiner* — John B King
(74) *Attorney, Agent, or Firm* — Withrow & Terranova, P.L.L.C.

(57) ABSTRACT

Techniques for a host system or a user to verify the authenticity of a storage device or a logical sub-unit (e.g., a partition) of the storage device are disclosed. A storage device stores one or more first secret keys and a host device stores one or more second keys. A respective first secret key and a respective second key are used in a verification process that verifies the authenticity of the storage device prior to accessing the storage device.

17 Claims, 7 Drawing Sheets

(56) References Cited

U.S. PATENT DOCUMENTS

| | | | | |
|---|---|---|---|---|
| 2011/0179478 A1* | 7/2011 | Flick | ..................... | H04L 9/0822 |
| | | | | 726/9 |
| 2014/0032934 A1* | 1/2014 | Nagai | .............. | G11B 20/00086 |
| | | | | 713/193 |
| 2017/0150356 A1* | 5/2017 | Li | ........................ | H04W 12/069 |
| 2021/0263746 A1* | 8/2021 | Thom | .................. | G06F 3/0685 |
| 2022/0342581 A1* | 10/2022 | Cariello | ................ | G06F 3/0679 |

FOREIGN PATENT DOCUMENTS

| | | | | | | |
|---|---|---|---|---|---|---|
| EP | 3251284 | B1 | * | 8/2020 | ......... | H04L 63/0428 |
| JP | 2008124987 | A | * | 5/2008 | | |
| KR | 20100005413 | A | * | 1/2010 | .............. | H04L 9/32 |
| WO | WO-2010054574 | A1 | * | 5/2010 | ............. | G06F 12/14 |
| WO | WO-2020001078 | A1 | * | 1/2020 | ......... | G06F 12/1408 |
| WO | WO-2022212396 | A1 | * | 10/2022 | ........... | H04L 9/3271 |

OTHER PUBLICATIONS

Menezes, A.J., van Oorschot, P.C., & Vanstone, S.A. (1997). Handbook of Applied Cryptography (1st ed.). CRC Press. https://doi.org/10.1201/9780429466335, p. 321-355 (Year: 1997).*
Menezes, A.J., van Oorschot, P.C., & Vanstone, S.A. (1997). Handbook of Applied Cryptography (1st ed.). CRC Press. https://doi.org/10.1201/9780429466335, p. 397-402 (Year: 1997).*
TCG, "TCG Storage Architecture Core Specification," Specification Version 2.01, Revision 1.00, Aug. 5, 2015, Trusted Computing Group, Incorporated, 306 pages.

* cited by examiner

VERIFYING THE AUTHENTICITY OF STORAGE DEVICES

FIELD OF THE DISCLOSURE

The present disclosure relates generally to storage devices, and more particularly to methods and apparatuses for verifying the authenticity of storage devices.

BACKGROUND

Many data storage security solutions focus on authenticating a user and/or a host device before the user and/or the host device is allowed to access data stored in a storage device. The user and/or the host device must provide credentials to verify the identity of the user and/or the host device. Once authenticated, the user and/or the host device is able to access a computing resource (e.g., a computer or a local or global network), data that is stored in the computing resource, or data that is stored on a storage device that is connected to the computing resource.

In some situations, a rogue or untrusted storage device may be connected to the computing resource. If the user and/or the host device accesses data that is stored on the untrusted storage device, that data may compromise the host device and/or the computing resource (e.g., an entire network). For example, the host device can download malware, an infected file (e.g., a document or a movie), or a software application that can damage the host device. In some instances, the malware, the infected file, or the software application can also damage one or more other electronic devices that are connected to the host device. Additionally or alternatively, the malware, the infected file, or the software application may provide a means for bad actors to access data that is stored in the host device and/or the one or more other electronic devices that are connected to the host device.

SUMMARY

Embodiments disclosed herein provide techniques for a host system or a user to verify the authenticity of a storage device (e.g., solid-state drive), or a logical sub-unit of the storage device (e.g., a partition). The verification techniques ensure the storage device and/or the logical sub-unit of the storage device is a trusted entity before commencing data input transactions and data output transactions. Verification of the storage device can ensure safe data transactions.

In one aspect, a storage device includes a storage medium operable to store data therein and a secure storage medium operable to store one or more secret keys. A processing device operably connected to the storage medium and to the secure storage medium is operable to receive a verification message, access a secret key in the one or more secret keys, and process the verification message and the secret key to produce a verification key. In a non-limiting nonexclusive example, the verification message is, or includes, a single-use key, and the single-use key and the secret key are concatenated to produce the verification key. In certain embodiments, a proxy of the verification key is generated. The verification key or the proxy of the verification key enables the authenticity of the storage device to be verified. For example, the verification key or the proxy of the verification key is used in a verification process to verify the authenticity of the storage device.

In another aspect, a method of operating a storage device includes receiving a verification message, where the verification message is or includes a single-use key. The verification message (e.g., the single-use key) and a secret key stored in the storage device are processed to produce a verification key. In certain embodiments, a proxy of the verification key is generated. The verification key or the proxy of the verification key is transmitted to a host device to enable the host device to verify the authenticity of the storage device.

In yet another aspect, a system includes a storage device and a host device operably connected to the storage device. The storage device includes a storage medium operable to store data therein and a first secure storage medium operable to store one or more first secret keys. A first processing device is operably connected to the storage medium and the first secure storage medium. The first processing device is operable to receive a single-use key from the host device, access a first secret key in the one or more first secret keys, and process the single-use key and the first secret key to produce a first verification key. The first verification key is operable to verify the authenticity of the storage device. The host device includes a second secure storage medium operable to store one or more second secret keys and a second processing device operably connected to the second secure storage medium. The second processing device is operable to transmit the single-use key to the storage device and receive the first verification message from the storage device. The second processing device processes the single-use key and a respective second secret key to produce a second verification key. The second processing device is operable to determine whether the first verification key matches or corresponds to the second verification key to verify the authenticity of the storage device. Based on a successful verification of the authenticity of the storage device, the second processing device is operable to enable access to at least a portion of the data stored in the storage medium in the storage device.

In one embodiment, both the storage device and the host device store one or more first secret keys. In a non-limiting nonexclusive example, the one or more first secret keys are shared secret keys stored in both the host device and the storage device. In another embodiment, the storage device stores one or more second secret keys and the host device stores one or more third keys. In a non-limiting nonexclusive example, the one or more second secret keys are one or more private keys and the one or more third keys are one or more public keys (e.g., for asymmetric key cryptography such as public-key infrastructure). In yet another embodiment, the storage device stores one or more first secret keys and one or more second secret keys, and the host device stores the same one or more first secret keys and one or more third keys.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serves to explain the principles of the disclosure.

DETAILED DESCRIPTION

Figure 1A:
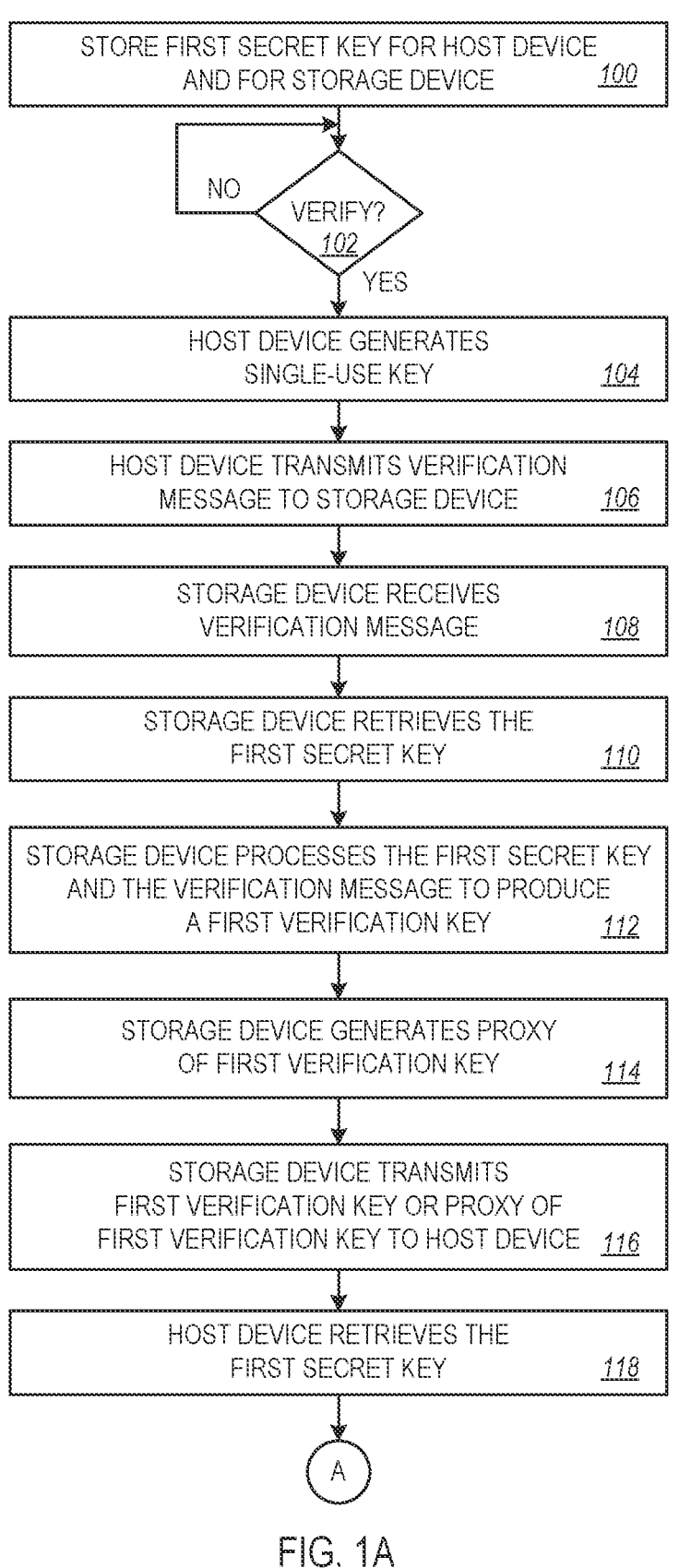
FIGS. 1A-1B illustrate a flow diagram of an example first method for verifying the authenticity of a storage device in accordance with embodiments of the disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments disclosed herein provide techniques for verifying the authenticity of a storage device. For example, a user of a host device that is operably connected to a storage device, or the host device itself, may verify the authenticity of the storage device before accessing the storage device (e.g., read access or write access to a storage medium in the storage device). For example, a user of the host device may discover a storage device that is newly added to a network. The user may use the host device to verify the authenticity of the storage device. Additionally or alternatively, an storage device may be operably connected to a network or to a first host device. In response to the connection of the storage device, a second host device on the network or the first host device can initiate verification of the storage device. The storage device can be an external storage device (e.g., a stand-alone storage device), an internal storage device in an electronic device (e.g., a computing device), or an internal storage device in the host device.

The data stored in the storage device may be electronic data and/or electronic instructions, such as program instructions or software applications (collectively referred to as "data"). In one embodiment, the verification process may be used to verify the entire storage device (e.g., access to all of the data stored in the external storage device). In another embodiment, the verification process can be used to verify a logical sub-unit (e.g., a partition) of the storage device.

Embodiments are described herein in conjunction with one or more first secret keys, one or more first keys, and one or more second keys. Each of the first secret key, the first key, and the second key can be any type of data that can be used in a verification process to verify the authenticity of the storage device. For example, each of the first secret key, the first key, and the second key may be implemented as a password, a passphrase, biometric data (e.g., a fingerprint or a voiceprint), and/or a string of characters. In certain embodiments, a character refers to a single letter, a single number, a single space, a single punctuation mark, or a single symbol, and a string of characters refers to a set of one or more characters (e.g., a series of one or more characters). The string of characters may be randomly generated by a random string generator. For example, when the string of characters is a string of numbers, the random string generator is a random number generator.

Figure 1B:
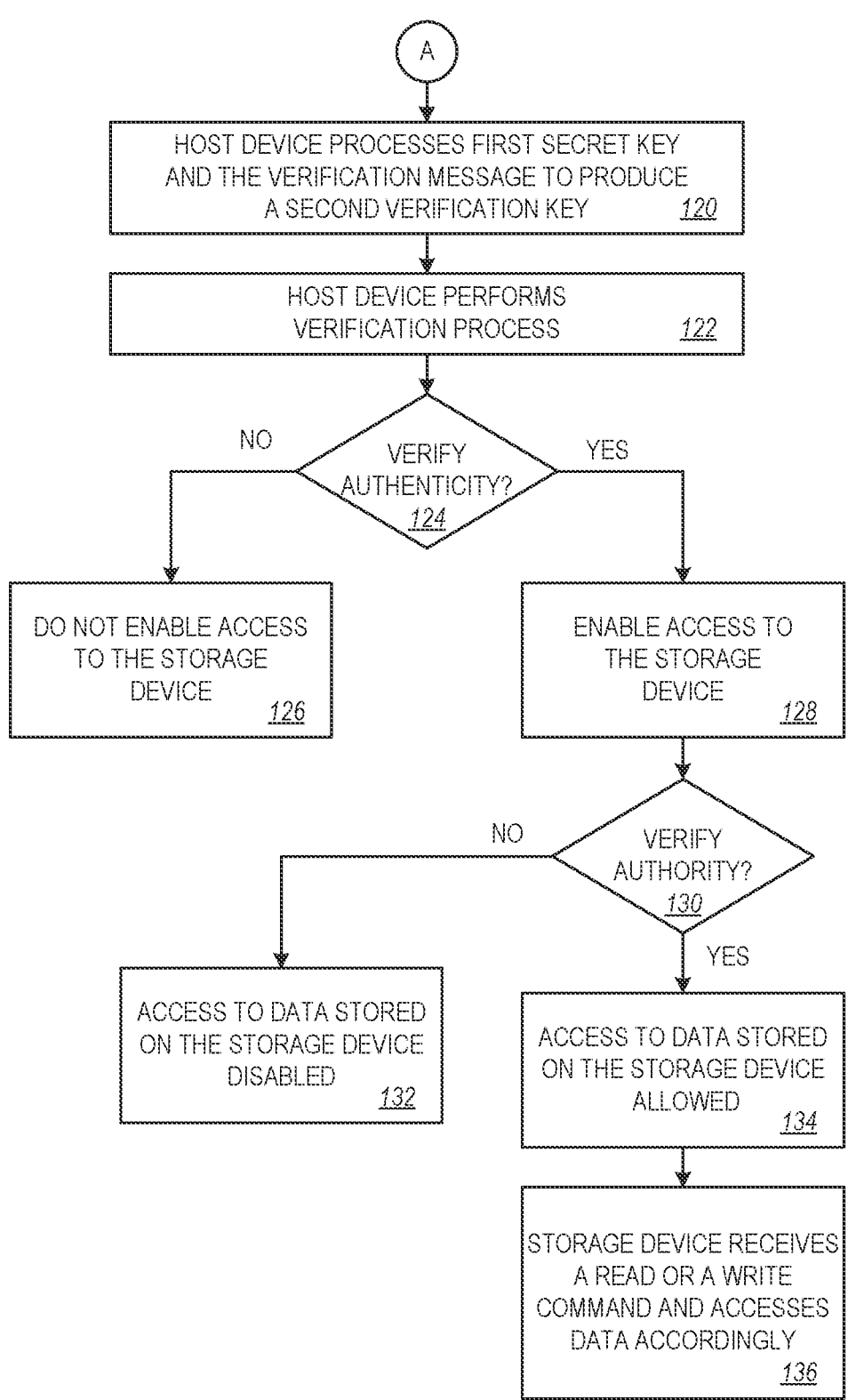

FIGS. 1A-1B illustrate a flow diagram of an example method for verifying the authenticity of a storage device in accordance with embodiments of the disclosure. FIGS. 1A-1B are described in conjunction with both the storage device and the host device storing the same first secret key, where the first secret key is a shared secret (e.g., as in a symmetric-key cryptography). However, as described in more detail in conjunction with FIG. 6, other embodiments can use multiple first secret keys.

Initially, as shown in block 100, a first secret key is stored for the storage device and for the host device. In the embodiment shown in FIGS. 1A-1B, the first secret key is described as a shared secret (e.g., for symmetric cryptography). As will be described in more detail later, the first secret key is used in a verification process to verify the authenticity of the storage device. In certain embodiments, the first secret key is stored in a secure storage medium in the storage device and in the host device. The first secret key may be stored in the secure storage medium by an administrator of the storage device and an administrator of the host device.

A determination is made at block 102 as to whether the host device is ready to verify the authenticity of a storage device. The host device may verify the authenticity of the storage device once (e.g., when the storage device is first operably connected to the host device), at select times, or every time the host device will access (or enable access to) the storage device. The process waits at block 102 when a determination is made that the host device is not ready to verify the authenticity of the storage device at that time.

When a determination is made at block 102 that the host device is ready to verify the authenticity of the storage device, the method passes to block 104 where the host device generates a single-use key. The single-use key may be a temporary key that is used only once. In certain embodiments, the single-use key is a randomly generated single-use key. For example, the host device may generate a session key, which may be a random number generated by a random number generator.

Next, as shown in block 106, the host device transmits a verification message to the storage device. The verification message is or includes the single-use key generated at block 104. The storage device receives the verification message at block 108. The storage device then retrieves the first secret key from a storage medium in or operably connected to the storage device, such as a secure storage medium that is only accessible by the storage device (block 110). In one embodiment, the secure storage medium is located within the storage device itself. For example, the secure storage medium may be located within a processing device or within a storage medium in the storage device. In another embodiment, the secure storage medium is located within a secure storage device that only the storage device is operable to access.

The storage device processes the first secret key and the first verification message (e.g., the single-use key) to produce a first verification key at block 112. In certain embodiments, the storage device concatenates the single-use key and the shared secret to produce a string concatenation, where the string concatenation is the first verification key. The processing of the verification message (e.g., the single-use key) and the shared secret is a symmetric key encryption process. A non-limiting nonexclusive example of a symmetric key encryption process is the Advanced Encryption Standard (AES)-256 encryption process.

The processing may further include generating a proxy of the first verification key at block 114. A proxy of the first verification key is data that represents the first verification key in another form. The proxy may have a smaller or reduced data size compared to the first verification key. In one non-limiting nonexclusive example, the storage device executes a hash function to produce a hash value of the first verification key. The hash value is a proxy of the first verification key.

Next, as shown in block 116, the storage device transmits the first verification key or the proxy of the first verification key to the host device. The host device then retrieves the first secret key from a storage device, such as a secure storage medium that is only accessible by the host device (block 118). The host device processes the first secret key and the verification message (e.g., the single-use key) that was produced at block 106 to generate a second verification key (block 120).

To generate the second verification key, the processing operation(s) performed by the host device at block 120 are the same processing operation(s) that were performed by the storage device at block 112 or at blocks 112, 114 (when a proxy of the first verification key is produced). For example, if the storage device concatenated the single-use key and the shared secret to produce the first verification key, the host device concatenates the single-use key with the shared secret that is stored in the host device to produce the second verification key. If the storage device generated a proxy of the first verification key, the host device generates a proxy of the second verification key using the same proxy-generating method. In one non-limiting nonexclusive example, the host device concatenates the single-use key and the shared secret to produce the second verification key, and then executes the hash function to produce a hash value of the second verification key.

The host device then performs a verification process at block 122 to determine whether the first verification key corresponds to the second verification key. In a non-limiting nonexclusive example, the verification process includes the comparison of the first verification key and the second verification key (or the proxy of the first verification key and the proxy of the second verification key) to determine whether the first verification key and the second verification key match (or the proxy of the first verification key and the proxy of the second verification key match).

A determination is made at block 124 as to whether the authenticity of the storage device is verified. For example, a determination is made as to whether the first verification key matched the second verification key (or whether the proxy of the first verification key matched the proxy of the second verification key). If a determination is made that the authenticity of the storage device is not verified, the process passes to block 126 where the host device does not enable access to the storage device (e.g., the host device will not initiate any kind of access to storage device). In certain embodiments, the host device can place the storage device offline or ignore the storage device.

When a determination is made at block 124 that the authenticity of the storage device is verified, the method continues at block 128 where the host device enables access to the storage device (e.g., the host device can initiate any kind of access to storage device). Additionally or alternatively, the host device may enable one or more other devices to access the storage device (e.g., other electronic devices on the same network).

In some embodiments, once the authenticity of the storage device is verified, the authority of the host device or of a user attempting to access the storage device and/or data stored in the storage device is determined at block 130. The host device or the user may submit credentials that are used to determine whether the host device or the user has the authority to access the storage device and/or some or all of the data stored on the storage device. Example credentials include, but are not limited to, a password, a personal identification number (PIN), a token, or biometrics (e.g., a fingerprint).

If a determination is made that the host device and/or the user is not authorized to access the storage device, the process passes to block 132 where access to the storage device or to select data in the storage device is disabled. When a determination is made that the host device and/or the user is authorized to access the storage device, the method continues at block 134 where access to the storage device or to some or all of the data on the storage device is allowed. The storage device may then receive a read request from the host device, access the data associated with the read request, and transmit the data to the host device (block 136). Additionally or alternatively, the storage device can receive a write request from the host device and write data associated with the write request to the storage device (block 136). Those skilled in the art will recognize that the storage device may receive other types of requests or commands and respond accordingly.

The method shown in FIGS. 1A-1B can include additional blocks or omit blocks in other embodiments. For example, blocks 130 and 132 may be omitted in other embodiments. Additionally or alternatively, block 114 can be omitted in other embodiments. In some embodiments, the order of the blocks can be changed or some blocks may be performed in parallel rather than sequentially.

Figure 2A:
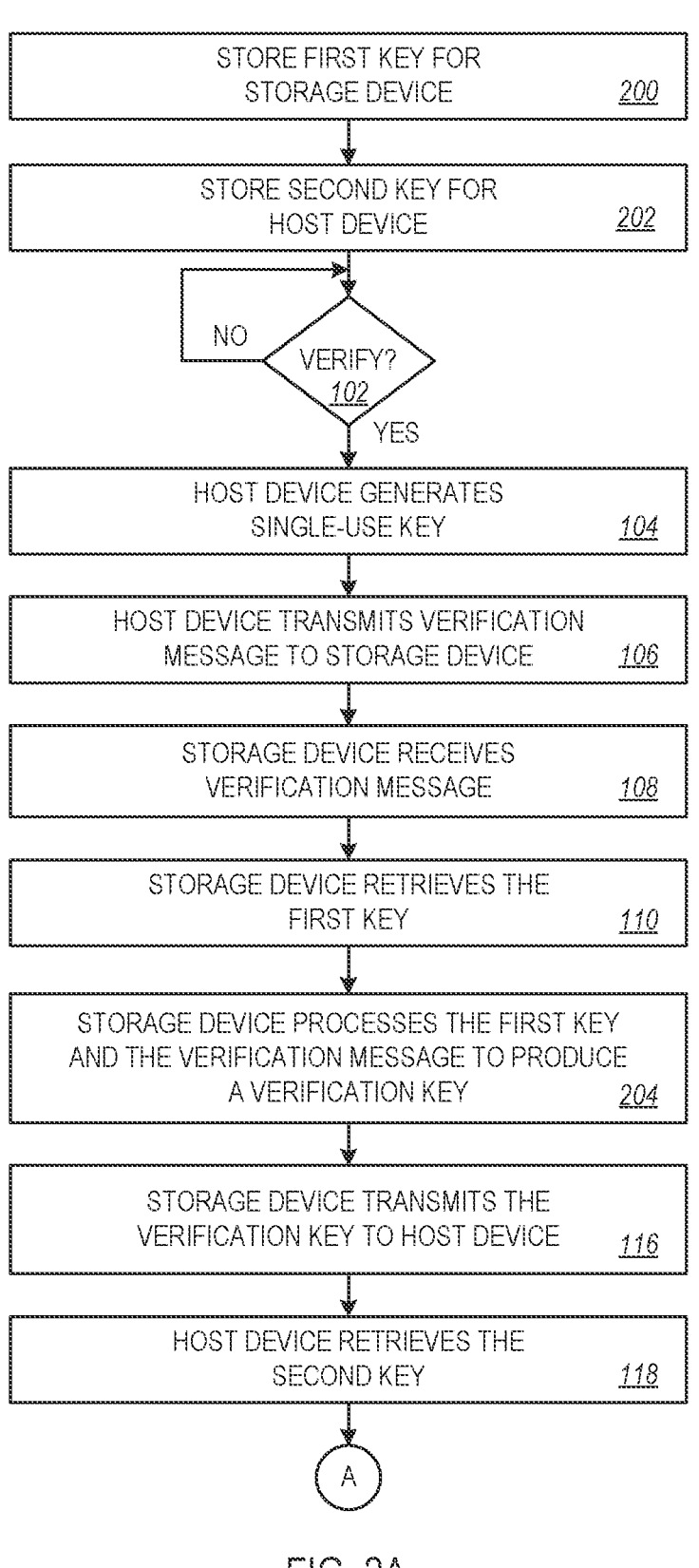
FIGS. 2A-2B illustrate a flow diagram of an example second method for verifying the authenticity of a storage device in accordance with embodiments of the disclosure.
Figure 2B:
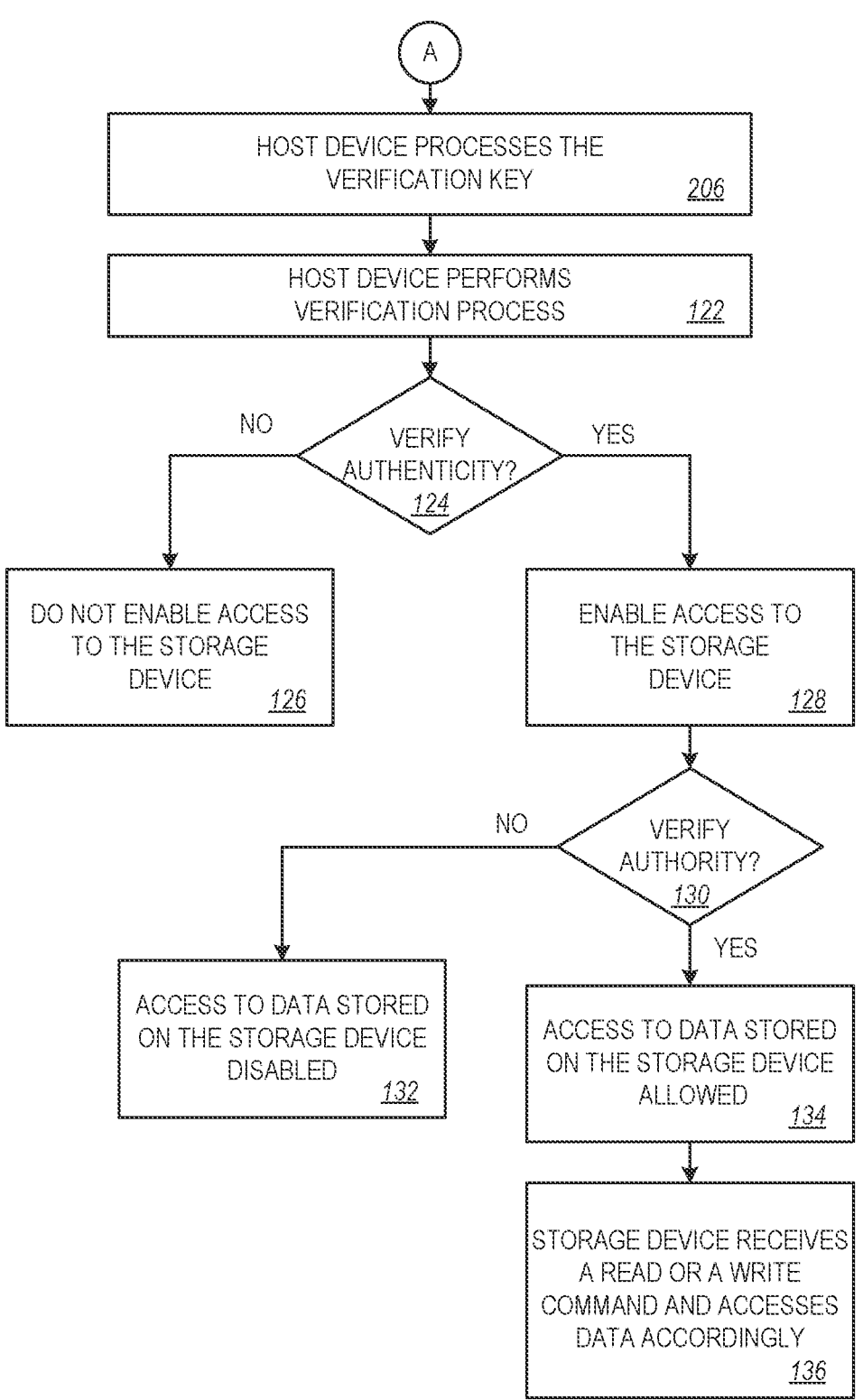

FIGS. 2A-2B illustrate a flow diagram of an example second method for verifying the authenticity of a storage device in accordance with embodiments of the disclosure. FIGS. 2A-2B are described in conjunction with a first key and a different second key. In one embodiment, the first key is a private key and the second key is a public key. However, other embodiments are not limited to this configuration. As will be described in more detail later, the storage device may store one or more first keys and the host device may store one or more second keys.

Generally, a private key and a corresponding public key are complementary to each other. The private key and the public key are typically generated together by an asymmetric cryptography algorithm, such a Rivest-Shamir-Adleman (RSA) algorithm, an Elliptic Curve algorithm, and the like. In certain embodiments, a processing device in a storage device generates the private key and the public key. The private key is then stored securely in the storage device and the public key is transmitted directly to a host device or to an external key repository for storage. If the public key is transmitted to the external key repository, the public key is provisioned to the host device for use in verifying the authenticity of the storage device (e.g., when the host device is ready to verify the authenticity of the storage device). In other embodiments, the private key and the public key are generated by an external electronic device (e.g., a secure server). The private key is then provisioned to the storage device and the public key is provisioned to the host device. For example, the private key and the public key may be provisioned for storage in the storage device and the host device, respectively, or when the host device is ready to verify the authenticity of the storage device.

The flow diagram in FIGS. 2A-2B is similar to the flow diagram shown in FIGS. 1A-1B with the exception of blocks 200, 202, and 204. The blocks in FIGS. 2A-2B that are also shown in FIGS. 1A-1B are not described in detail herein for brevity. Initially, as shown in block 200, a first key is stored for the storage device. In certain embodiments, the first key is stored in a secure storage medium in, or operably connected to, the storage device. The first key may be stored in the secure storage medium by an administrator of the storage device.

Next, as shown in block 202, a second key is stored for a host device. The flow diagram in FIGS. 2A-2B is described in conjunction with the first key as a private key and the second key as a public key (e.g., private key/public key for asymmetric key cryptography). As will be described in more detail later, the first key and the second key are used in the verification process to verify the authenticity of the storage device. In certain embodiments, the second key is stored in a secure storage medium in the host device. The second key may be stored in the secure storage medium by an administrator of the host device.

A determination is made at block 102 as to whether the host device is ready to verify the authenticity of the storage device. The process waits at block 102 if a determination is made that the host device is not ready to verify the authenticity of the storage device at that time. When a determination is made at block 102 that host device is ready to verify the authenticity of the storage device, the process passes to block 104 where the host device generates the single-use key.

Next, as shown in blocks 106 and 108, the host device transmits the verification message to the storage device and the storage device receives the verification message. The storage device retrieves the first key from the storage medium in or operably connected to the storage device, such as the secure storage medium that is only accessible by the storage device (block 110).

The storage device processes the first key and the first verification message (e.g., the single-use key) to produce a verification key at block 204. In one embodiment, the storage device encrypts the verification message (e.g., the single-use key) using the first key, and the encrypted verification message is the verification key. The encryption of the verification message with the first key is an asymmetric key encryption process. A non-limiting nonexclusive example of an asymmetric key encryption process is an RSA-2048 encryption process.

Next, as shown in block 116, the storage device transmits the verification key to the host device. The host device then retrieves the second key from a storage device, such as a secure storage medium that is only accessible by the host device (block 118). The host device processes the second key and the verification key (e.g., the single-use key) at block 206. For example, the host device decrypts the encrypted verification key using the public key that was stored for the host device at block 202.

The host device then performs a verification process at block 122. In one embodiment, the verification process compares the decrypted verification message (e.g., the decrypted single-use key) with the original verification message (e.g., the single-use key) that was transmitted at block 106. In a non-limiting nonexclusive example, the host device compares the decrypted verification message (e.g., the decrypted single-use key) with the original verification message (e.g., the original single-use key) to determine whether the decrypted verification message (e.g., the decrypted single-use key) matches the original verification message (e.g., the original single-use key).

A determination is made at block 124 as to whether the authenticity of the storage device is verified. For example, a determination is made as to whether the decrypted verification message (e.g., the decrypted single-use key) and the original verification message (e.g., the original single-use key) match. The method then performs block 126, or blocks 128, 130, and 132, or blocks 128, 130, 134, and 136.

The method shown in FIGS. 2A-2B can include additional blocks or omit blocks in other embodiments. For example, blocks 130 and 132 may be omitted in other embodiments. Additionally or alternatively, the order of the blocks can be changed or some blocks may be performed in parallel rather than sequentially.

Figure 3:
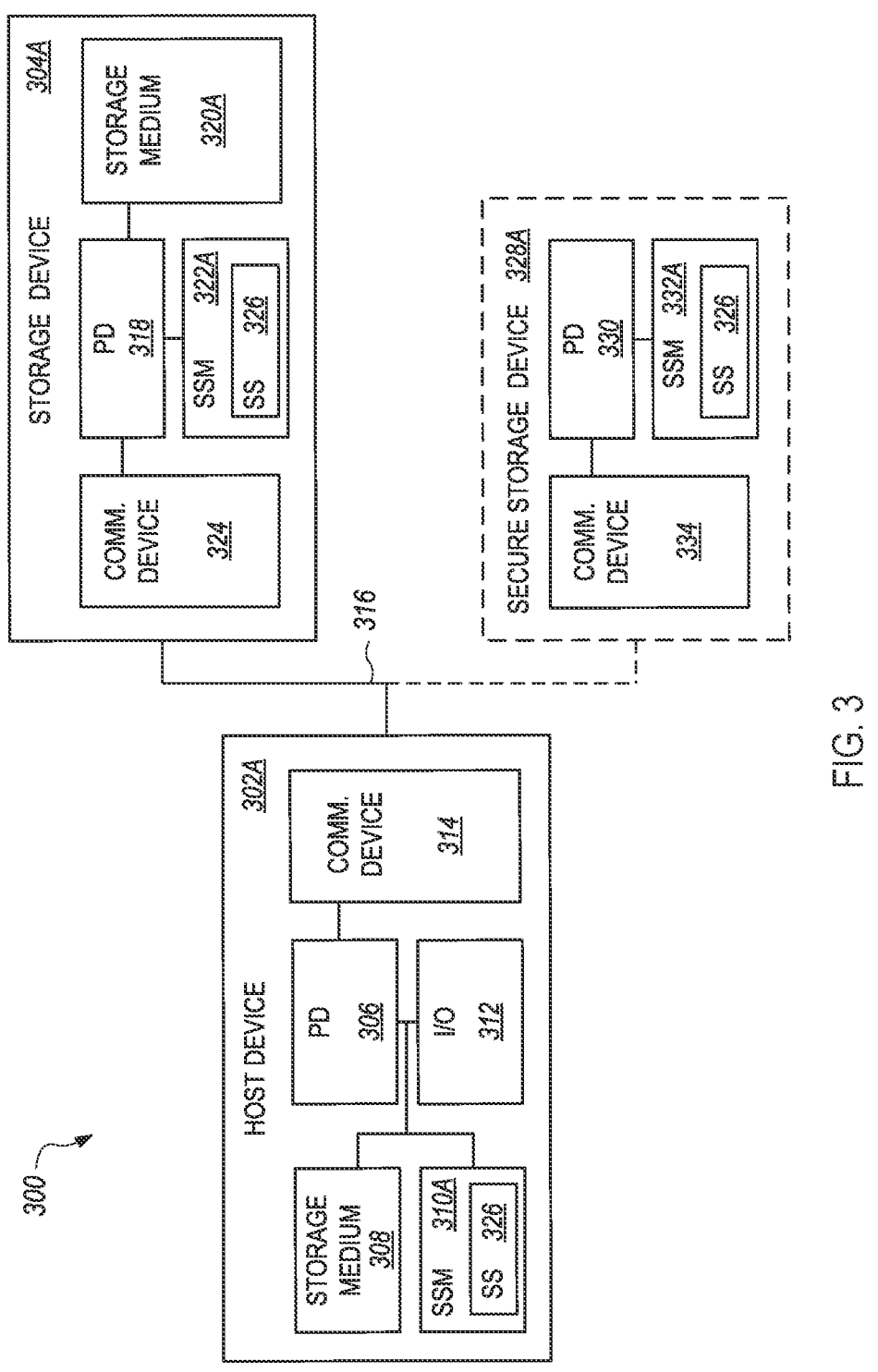
FIG. 3 illustrates a block diagram of a first example system that can perform the method shown in FIGS. 1A-1B in accordance with embodiments of the disclosure.

FIG. 3 illustrates a block diagram of a first example system 300 that can perform the method shown in FIGS. 1A-1B in accordance with embodiments of the disclosure. FIG. 3 is described in conjunction with the use of a shared secret. However, other embodiments are not limited to this implementation. In some instances, a host device 302A stores a second key (e.g., a public key) and a storage device 304A stores a first key (e.g., a private key). In such embodiments, the system performs the method shown in FIGS. 2A-2B.

The system 300 includes the host device 302A operably connected to the storage device 304A. The host device 302A can be implemented as an electronic device that is operable to process, store, and retrieve electronic data. Non-limiting nonexclusive examples of the host device 302A include a personal computer, a tablet, a smart phone, a portable computing device, a server, a workstation, or a wearable computing device.

The example host device 302A includes one or more processing devices (collectively referred to as processing device (PD) 306) that is operably connected to one or more storage media (collective referred to as storage medium 308), a secure storage medium (SSM) 310A, one or more input/output devices (collectively referred to as I/O device 312), and one or more communication devices (collective referred to as communication device (comm. device) 314). The processing device 306 may be implemented, for example, as a central processing unit, a microprocessor, an application-specific integrated circuit, a field-programmable gate array, a graphics processing unit, or combinations thereof.

The storage medium 308 and the secure storage medium 310A each includes one or more processor-readable storage media that are used to store data. Example processor-readable storage media include non-volatile storage media or volatile storage media such as flash memory, read-only memory (ROM), magnetic storage media, optical storage media, a random-access memory (RAM), or combinations thereof. The processing device 306 is operable to access data (e.g., read and write) stored in the storage medium 308.

The secure storage medium 310A is a limited access storage medium that may be accessed only by the processing device 306. Other devices, such as another electronic device (not shown), cannot access the secure storage medium 310A. Although the secure storage medium 310A is depicted as a separate storage medium, the secure storage medium 310A can be implemented within the storage medium 308 or within the processing device 306.

The I/O device 312 is any device that enables a user or another device (not shown) to interface with the host device 302A. Non-limiting nonexclusive examples of the I/O device 312 include a keyboard (virtual and/or physical), a microphone, a speaker, a display, a cursor control device (e.g., a mouse or an electronic pen), a scanner, a camera, one or more data ports, or a printer.

The communication device 314 is operable to communicate (e.g., transmit and receive data) with another electronic device (not shown) and/or with the storage device 304A over one or more networks (collectively referred to as network

316). The communication device 314 may be implemented as a Wi-Fi device, a short-range wireless device (e.g., BLUETOOTH), an infrared device, a network card (e.g., Ethernet), a near-field communication device, another type of a communication device, or combinations thereof. The network 316 may be a wired or a wireless network, such as a cellular network, a local area network, a wide area network, a wireless local area network, a virtual private network, a global network (e.g., the Internet), or combinations thereof.

The example storage device 304A can be an external storage device (e.g., a stand-alone storage device) or an internal storage device in another electronic device. The storage device 304A can be implemented as a hard disk drive (HDD), a solid-state drive (SSD), a removable storage device, or another type of storage device. The storage device 304A includes one or more processing devices (collectively referred to as processing device (PD) 318) that is operably connected to one or more storage media (collective referred to as storage medium 320A), a secure storage medium (SSM) 322A, and one or more communication devices (collectively referred to as communication device (comm. device) 324). The processing device 318 may be implemented, for example, as a central processing unit, a microprocessor, an application-specific integrated circuit, a field-programmable gate array, a graphics processing unit, or combinations thereof.

The storage medium 320A and the secure storage medium 322A each includes one or more processor-readable storage media that are used to store data. Non-limiting examples of storage media are non-volatile storage media or volatile storage media, including, but not limited to, flash memory, ROM, magnetic storage media, optical storage media, or RAM. The host device 302A, via the processing device 318, is operable to access data (e.g., read and write) stored in the storage medium 320A.

The secure storage medium 322A is a limited access storage medium that may be accessed only by the processing device 318. Other devices, such as the host device 302A or another electronic device (not shown) cannot access the secure storage medium 322A. Although the secure storage medium 322A is depicted as a separate storage medium, the secure storage medium 322A can be implemented within the storage medium 320A or within the processing device 318.

The communication device 324 is operable to communicate (e.g., transmit and receive data) with another electronic device (not shown) and with the host device 302A over the network 316. The communication device 324 may be implemented as a Wi-Fi device, a short-range wireless device (e.g., BLUETOOTH), an infrared device, a network card (e.g., Ethernet), a near-field communication device, or combinations thereof.

The secure storage medium 322A in the storage device 304A stores a shared secret (SS) 326. The secure storage medium 310A in the host device 302A also stores the shared secret (SS) 326. The shared secret 326 is referred to as "shared" because the same secret is shared (e.g., stored and/or processed) in the host device 302A and in the storage device 304A. The shared secret 326 may be any type of shared secret. For example, the shared secret 326 can be implemented as a password, a PIN, biometric data (e.g., a fingerprint or a voiceprint), a private key, and/or a string of characters. As will be described in more detail later, the shared secret 326 is used by the host device 302A to verify the authenticity of the storage device 304A prior to accessing the storage device 304A. Based on a successful verification of the authenticity of the storage device 304, the host device 302A enables data stored in the storage medium 320A to be accessed (e.g., read). The host device 302A may verify the authenticity of the storage device 304A once, at select times, or every time the host device 302A is ready to access the storage device 304A.

In some embodiments, a secure storage device 328A is used to store the shared secret 326 instead of storing the shared secret 326 in the secure storage medium 322A in the storage device 304A. In other embodiments, the secure storage device 328A stores a first key instead of storing the first key in the secure storage medium 322A in the storage device 304A.

The secure storage device 328A is "secure" because the secure storage device 328A is accessible only by the storage device 304A via the network 316. For example, firmware executed by the processing device 318 in the storage device 304A and firmware executed by a processing device 330 in the secure storage device 328A can be used to restrict access to the secure storage device 328A. Other devices, such as the host device 302A or another electronic device (not shown), cannot access the secure storage device 328A. The secure storage device 328A can be implemented as HDD, SSD, a removable storage device, or another type of storage device.

The example secure storage device 328A includes one or more processing devices (collectively referred to as the processing device (PD) 330), a secure storage medium (SSM) 332A, and one or more communication devices (collectively referred to as communication device (comm. device) 334). The processing device 330 may be implemented, for example, as a central processing unit, a microprocessor, an application-specific integrated circuit, a field-programmable gate array, a graphics processing unit, or combinations thereof.

The secure storage medium 332A includes one or more processor-readable storage media that is used to store the shared secret 326. Non-limiting examples of storage media are non-volatile storage media or volatile storage media, including, but not limited to, flash memory, ROM, magnetic storage media, optical storage media, or RAM. The secure storage medium 332A is a limited access storage medium that may be accessed only by the storage device 304A (e.g., via firmware executed by the processing device 318 in the storage device 304A and firmware executed by the processing device 330 on the secure storage device 328A). Although the secure storage medium 332A is depicted as a separate storage medium, the secure storage medium 332A can be implemented within the processing device 330.

The communication device 334 is operable to communicate (e.g., transmit and receive data) over the network 316 with the communication device 324 in the storage device 304A. The communication device 334 may be implemented as a Wi-Fi device, a short-range wireless device (e.g., BLUETOOTH), an infrared device, a network card (e.g., Ethernet), a near-field communication device, or combinations thereof.

As described earlier, the shared secret 326 is used to verify the authenticity of the storage device 304A. The host device 302A is operable to verify the authenticity of the storage device 304A before enabling access to the storage device 304A. Access to the storage device 304A may be limited to the host device 302A, or the host device 302A can enable multiple electronic devices to access the storage device 304A (in addition to or as an alternative to the host device 302A accessing the storage device 304A).

Figure 4:
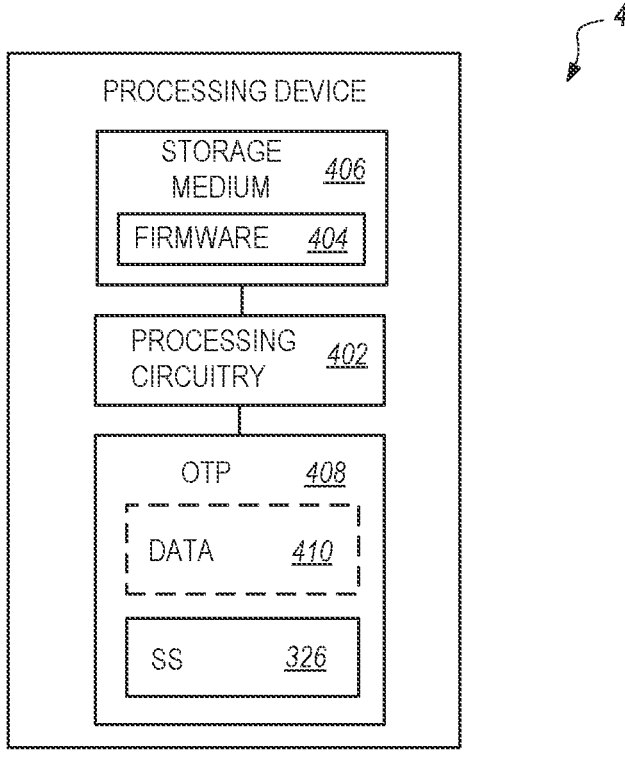
FIG. 4 illustrates a block diagram of an example processing device in accordance with embodiments of the disclosure.

FIG. 4 illustrates a block diagram of an example processing device 400 in accordance with embodiments of the disclosure. Similar to FIG. 3, FIG. 4 is described in conjunction with a shared secret. However, other embodiments are not limited to the implementation. In some instances, the processing device 400 stores a first key, a second key, a combination of first secret keys and first keys, or a combination of second keys and first secret keys (depending on whether the processing device 400 is included in the host device 302A (FIG. 3) or a host device 302B (FIG. 6), the storage device 304A (FIG. 3) or a storage device 304B (FIG. 6), or the secure storage device 328A (FIG. 3) or a secure storage device 328B (FIG. 6)).

Figure 6:
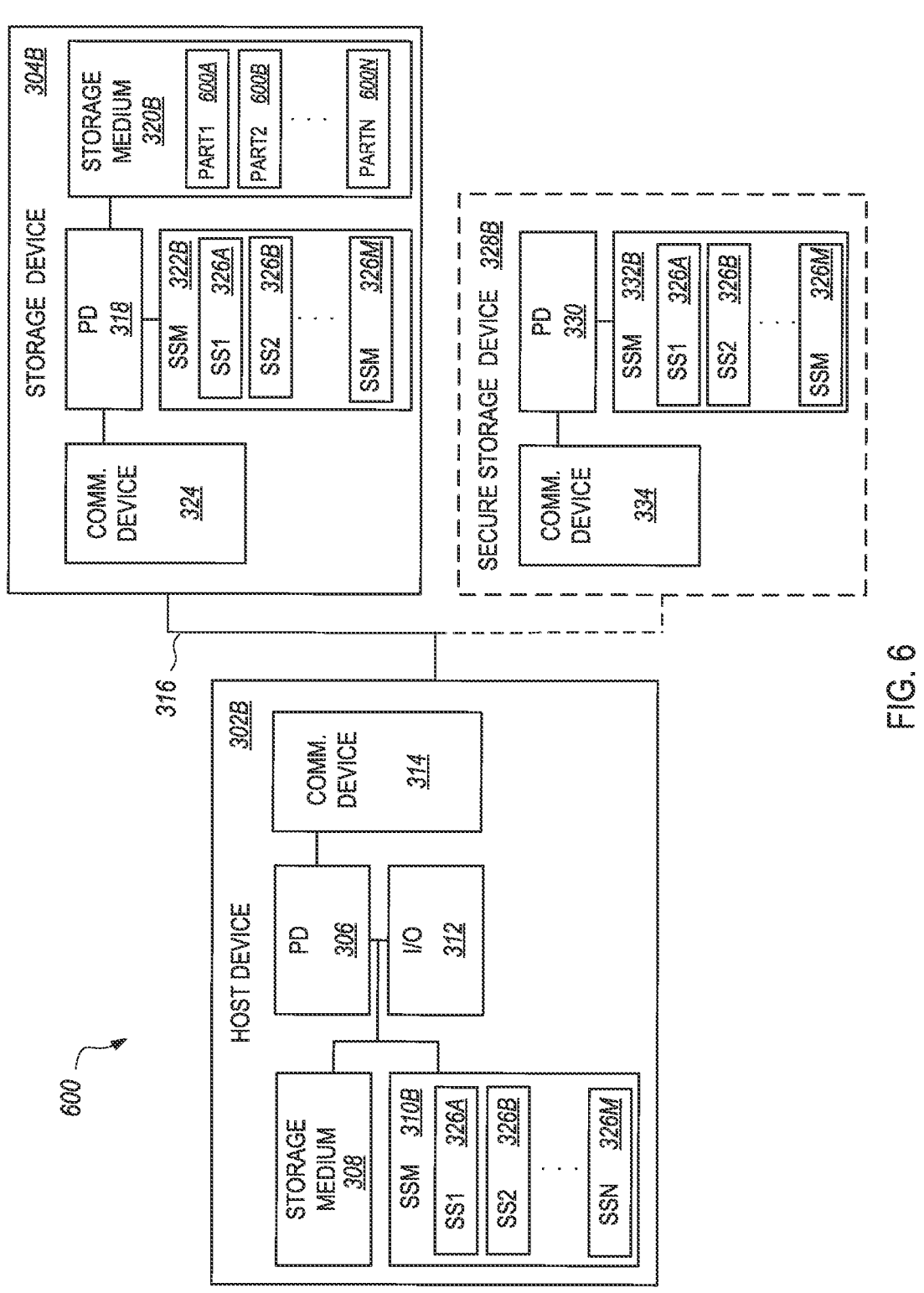
FIG. 6 illustrates a block diagram of a second example system in accordance with embodiments of the disclosure.

The processing device 400 may be the processing device 306 in the host device 302A (FIG. 3), the processing device 318 in the storage device 304A (FIG. 3), the processing device 330 in the secure storage device 328A (FIG. 3), the processing device 306 in the host device 302B (FIG. 6), the processing device 318 in the storage device 304B (FIG. 6), and/or the processing device 330 in the secure storage device 328B (FIG. 6). The example processing device 400 includes processing circuitry 402 that is operable to execute firmware 404 that is stored on a storage medium 406. In certain embodiments, the storage medium 406 is an updatable non-volatile storage medium, such as flash ROM.

The processing device 400 further includes a one-time-programmable (OTP) memory 408 that is operable to store the shared secret 326. In certain embodiments, the OTP memory 408 may also store additional data 410, such as data that is used to verify the authenticity of the firmware 404.

The firmware 404 includes programming instructions that when executed by the processing circuitry 402, cause the processing circuitry 402 to perform the processing operations of the processing device 400. The firmware 404 may also include instructions that limit access to the OTP memory 408 and to the shared secret 326 stored in the OTP memory 408 to the processing device 400 (e.g., the processing circuitry 402). No other internal device or external device may access the OTP memory 408.

Figure 5:
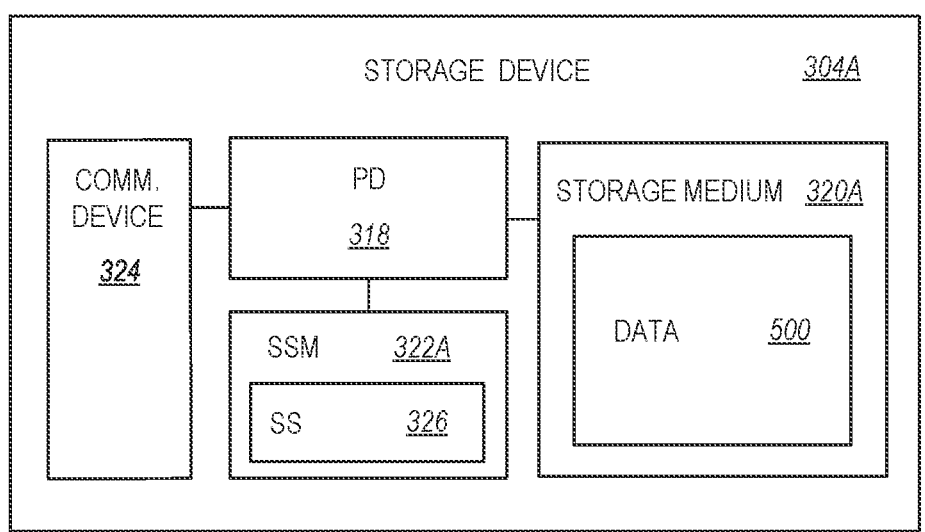
FIG. 5 illustrates a block diagram of an example storage device in accordance with embodiments of the disclosure.

FIG. 5 illustrates a block diagram of an example storage device 304A in accordance with embodiments of the disclosure. As described earlier in conjunction with FIG. 3, the storage device 304A includes the processing device 318, the storage medium 320A, the secure storage medium 322A with the shared secret 326 stored therein, and the communication device 324. In other embodiments, the example storage device 304A stores one or more shared secrets and/or one or more private keys.

The storage medium 320A stores data 500. The storage medium 320A is a non-partitioned storage medium (e.g., a single partition). Once the authenticity of the storage device 304A is verified, the host device (e.g., host device 302A in FIG. 3) enables access to all of the data 500. Access to the data 500 can be limited to the host device itself, to the host device and to one or more other devices (e.g., other electronic devices on the network 316 in FIG. 3), or to the one or more other devices but not to the host device.

FIG. 6 illustrates a block diagram of a second example system 600 in accordance with embodiments of the disclosure. The system 600 is similar to the system 300 shown in FIG. 3 with the exception of the use of multiple shared secrets. For brevity, the elements in FIG. 5 that are the same as the elements in FIG. 3 are not described again in detail.

A storage medium 320B in the storage device 304B is partitioned into multiple partitions 1-N, where N is equal to or greater than two (2). Each partition 600A, 600B, . . . , 600N is operable to store data. A secure storage medium 322B in the storage device 304B stores multiple shared secrets 1-M, where M is greater than one and less than or equal to N ($2 \leq M \leq N$). In one embodiment, M=N and each of the partition 600A, 600B, . . . , 600N is associated with a respective one of the shared secrets 326A, 326B, . . . , 326M. Thus, the shared secret 326A is used to verify the authenticity of the partition 600A prior to access, the shared secret 326B is used to verify the authenticity of the partition 600B prior to access, and the shared secret 326M is used to verify the authenticity of the partition 600N prior to access. In another embodiment, one shared secret is used to access multiple partitions (but not all of the partitions 600A, 600B, . . . , 600N). For example, the shared secret 326A can be used to verify the authenticity of the partition 600A and the partition 600B prior to access, while the shared secret 326B is used to verify the authenticity of the partition 600N prior to access.

A secure storage medium 3108 in the host device 302B stores the multiple shared secrets 326A, 326B, . . . , 326M. In systems that include a secure storage device 328B, the secure storage medium 332B stores the multiple shared secrets 326A, 326B, . . . , 326M. The shared secrets 326A, 326B, . . . , 326M are used to verify the authenticity of respective partitions 600A, 600B, . . . , 600N in the storage device 304B prior to accessing the respective partitions 600A, 600B, . . . , 600N.

Although FIG. 6 is described in conjunction with use of multiple shared secrets, other embodiments are not limited to configuration. In some instances, the host device 302B stores multiple second keys (e.g., public keys) or a combination of one or more second keys and one or more first secret keys (e.g., shared secrets). The storage device 304B stores multiple first keys (e.g., private keys) or a combination of one or more first keys and one or more first secret keys (e.g., shared secrets). In systems that include the secure storage device 328B, the secure storage medium 332B can store multiple first keys (e.g., private keys) or a combination of one or more first keys and one or more first secret keys (e.g., shared secrets).

Each of the partition 600A, 600B, . . . , 600N in the storage medium 320B is associated with a respective one of the first keys stored in the secure storage medium 322B (or in the secure storage medium 332B), and each second key stored in the secure storage medium 3108 is associated with a respective one of the first keys. Thus, a first first key and an associated first second key can be used to verify the authenticity of the partition 600A prior to access, a second first key and an associated second second key may be used to verify the authenticity of the partition 600B prior to access, and so on.

Alternatively, each of the partition 600A, 600B, . . . , 600N in the storage medium 320B is associated with a respective one of the one or more first secret keys or a respective one of the one or more first keys stored in the secure storage medium 322B (and/or in the secure storage medium 332B), and a respective one of the one or more first secret keys or a respective one of the one or more second keys stored in the secure storage medium 3108 is associated with a respective one of the one or more first secret keys or a respective one of the one or more first keys. Thus, a first first key and associated first second key can be used to verify the authenticity of the partition 600A prior to access, a first secret key may be used to verify the authenticity of the partition 600B prior to access, and so on.

In yet another embodiment, one first key and associated second key are used to access some but not all of the partitions 600A, 600B, . . . , 600N.

Those skilled in the art will recognize improvements and modifications to the preferred embodiments of the present disclosure. All such improvements and modifications are considered within the scope of the concepts disclosed herein and the claims that follow.

What is claimed is:

1. A storage device, comprising:
a storage medium operable to store data therein;
a secure storage medium operable to store a shared secret; and
a processing device operably connected to the storage medium and the secure storage medium, the processing device operable to:
receive a plurality of shared secrets;
store the shared secrets in partitions in the secure storage medium, wherein respective shared secrets are associated with one or more subsets of the partitions of the secure storage medium, wherein a subset of the partitions of the secure storage medium is lower in number of partitions than all of the partitions of the secure storage medium;
receive a verification message comprising a single-use key;
access the shared secrets;
process the single-use key and the shared secrets to produce verification keys corresponding to each of the respective shared secrets for verifying the authenticity of the partitions of the storage device; and
transmit, to a host device, the verification keys to facilitate authentication of the storage device.

2. The storage device of claim 1, wherein the secure storage medium is located in the processing device.

3. The storage device of claim 2, wherein the secure storage medium is a one-time-programmable memory.

4. The storage device of claim 1, wherein:
the processing of the single-use key and the shared secrets to produce the verification keys comprises concatenating the single-use key and the shared secrets.

5. The storage device of claim 4, wherein the processing of the single-use key and the shared secrets to produce the verification keys further comprises generating proxies of the concatenated single-use key and the shared secrets.

6. The storage device of claim 5, wherein the proxies are hash values.

7. The storage device of claim 4, wherein the single-use key is a random number.

8. The storage device of claim 1, wherein the shared secrets comprise one or more of:
a password;
biometric data; or
a string of characters.

9. A method of operating a storage device, the method comprising:
receiving a plurality of shared secrets;
storing the shared secrets in partitions in a secure storage medium, wherein respective shared secrets are associated with one or more of the partitions of the secure storage medium, wherein a subset of the partitions of the secure storage medium is lower in number of partitions than all of the partitions of the secure storage medium;
receiving a verification message, the verification message comprising a single-use key;
processing the single-use key and the shared secrets stored in the storage device to produce verification keys corresponding to each of the respective shared secrets; and transmitting the verification keys to a host device to enable the host device to verify the authenticity of the one or more partitions of the storage device.

10. The method of claim 9, further comprising:

after verification of the authenticity of the one or more partitions of the storage device, receiving a read request; and retrieving data associated with the read request.

11. The method of claim 9, further comprising:

after verification of the authenticity of the one or more partitions of the storage device, receiving a write request; and storing data associated with the write request.

12. The method of claim 9, wherein processing the single-use key and the shared secrets comprises concatenating the single-use key and the shared secrets to produce string concatenations that are used as the verification keys.

13. The method of claim 12, wherein processing the single-use key and the shared secrets further comprises generating hash values based on the string concatenations.

14. The method of claim 9, further comprising retrieving, by the storage device, the shared secrets from a secure storage medium within the storage device.

15. A system, comprising:

a storage device, comprising:

a storage medium operable to store data therein;

a secure storage medium operable to store a shared secret; and a processing device operably connected to the storage medium and the secure storage medium, the processing device operable to:

receive a plurality of shared secrets;

store the shared secrets in partitions in the secure storage medium, wherein respective shared secrets are associated with one or more of the partitions of the secure storage medium, wherein a subset of the partitions of the secure storage medium is lower in number of partitions than all of the partitions of the secure storage medium;

receive a single-use key from a host device;

access the shared secrets;

process the single-use key and the shared secrets to produce verification keys corresponding to each of the respective shared secrets operable to verify the authenticity of the one or more partitions of the storage device; and transmit, to the host device, the verification keys to facilitate authentication of the storage device.

16. The system of claim 15, wherein:

the processing device is a first processing device;

the secure storage medium is a first storage device;

the verification keys are first verification keys; and the host device comprises:

a second secure storage medium operable to store the shared secrets; and a second processing device operably connected to the second secure storage medium, the second processing device operable to:

transmit the single-use key to the storage device;

receive a first verification message;

process the single-use key and the shared secrets to produce second verification keys;

determine whether the first verification keys correspond to the second verification keys to verify the authenticity of the one or more partitions of the storage device; and based on a successful verification of the authenticity of the one or more partitions of the storage device, enable access to at least a portion of the data stored in the storage medium in the one or more partitions of the storage device.

17. The system of claim 15, wherein the storage medium is a non-partitioned storage medium and the shared secrets are associated with and enables access to all of the data stored in the one or more partitions of the secure storage medium.

* * * * *